United States Patent

[11] 3,603,602

[72] Inventor Lawrence D. Padula
  New Britain, Conn.
[21] Appl. No. 880,787
[22] Filed Nov. 28, 1969
[45] Patented Sept. 7, 1971
[73] Assignee Skinner Precision Industries, Inc.
  New Britain, Conn.
  Continuation-in-part of application Ser. No. 697,389, Jan. 12, 1968, now abandoned.

[54] REINFORCED SEAL
  8 Claims, 8 Drawing Figs.
[52] U.S. Cl. .................................................... 277/164,
  277/235, 277/209
[51] Int. Cl. .................................................... F16j 15/02
[50] Field of Search ........................................... 277/235,
  164, 211, 209; 251/DIG. 1

[56] References Cited
UNITED STATES PATENTS
| | | | |
|---|---|---|---|
| 1,984,806 | 12/1934 | Pfefferle ........................ | 277/235 |
| 2,573,225 | 10/1951 | Seamark ........................ | 277/235 X |
| 2,828,238 | 3/1958 | Batson et al. .................. | 277/235 X |
| 3,051,500 | 8/1962 | Wiltse ........................... | 277/164 UX |
| 3,445,120 | 5/1969 | Barr .............................. | 277/164 |

FOREIGN PATENTS
| | | | |
|---|---|---|---|
| 836,584 | 6/1960 | Great Britain ................ | 277/235 |
| 1,138,633 | 12/1957 | France .......................... | 277/164 |

Primary Examiner—Samuel B. Rothberg
Attorney—Prutzman, Hayes, Kalb & Chilton

ABSTRACT: A composite O-ring-type seal having a molded elastomeric body and a reinforcing spring embedded therein to prevent excessive deformation of the elastomeric body and in which the molded elastomeric body is contoured to provide for accurately locating the reinforcing spring within the body and to provide opposed annular sealing ribs for providing effective sealing.

PATENTED SEP 7 1971
3,603,602
SHEET 1 OF 2
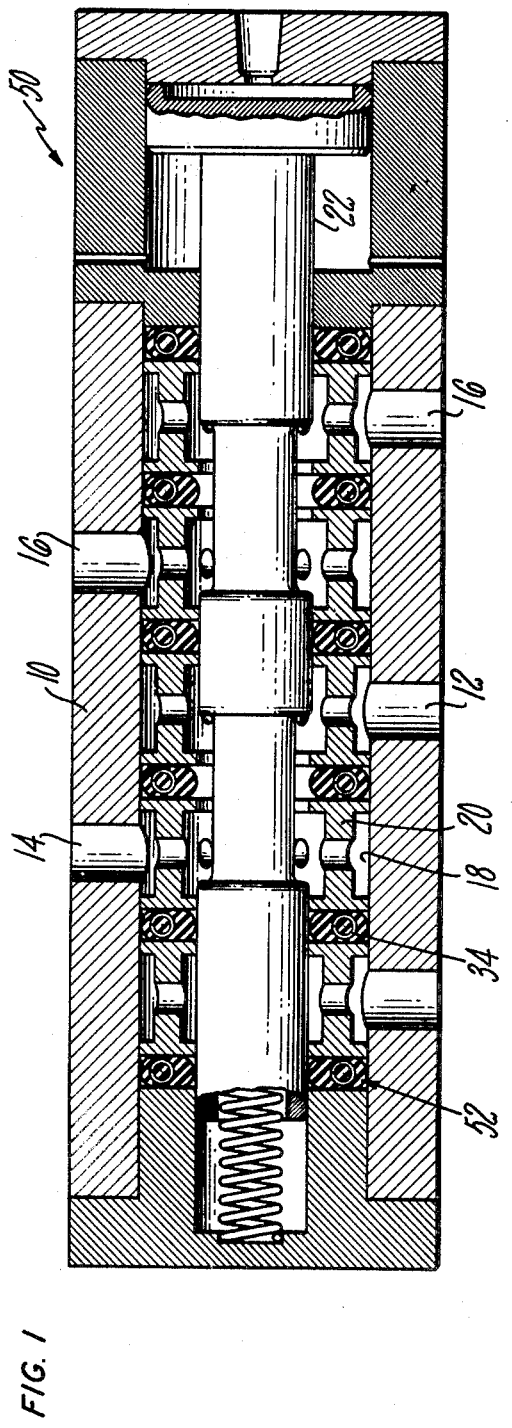
FIG. 1
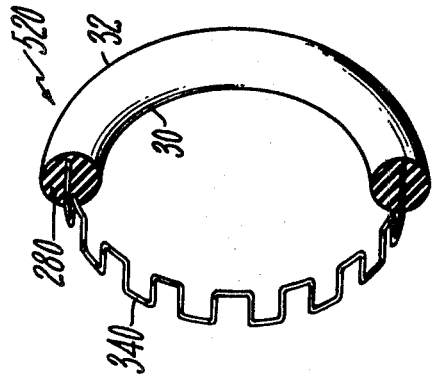
FIG. 4
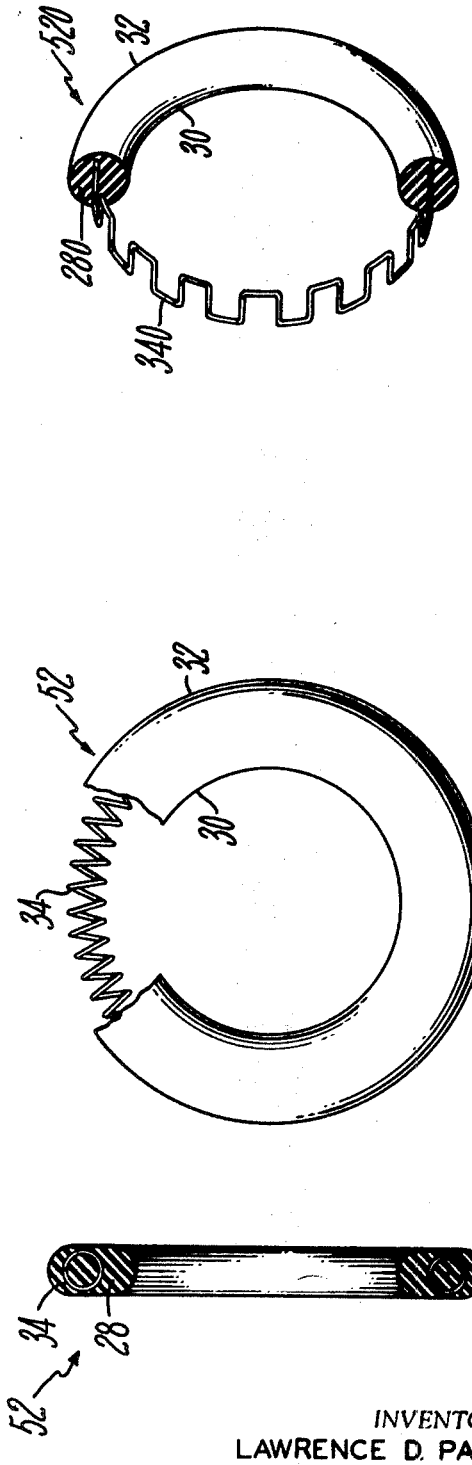
FIG. 3
FIG. 2
INVENTOR.
LAWRENCE D. PADULA
BY
Lindsey, Prutzman and Hayes
ATTORNEYS

PATENTED SEP 7 1971

REINFORCED SEAL

This application is a continuation-in-part of application Ser. No. 697,389, filed Jan. 12, 1968, and now abandoned.

BRIEF SUMMARY OF THE INVENTION

The present invention relates generally to elastomeric seals of the O-ring type and more particularly to a new and improved seal having an elastomeric body contoured to provide improved sealing and a reinforcing spring located within the elastomeric body to prevent excessive deformation of the body and maintain its sealing effectiveness.

It is a principal object of the present invention to provide a new and improved seal which is reinforced to prevent excessive deformation of the seal in one direction and is contoured to provide improved sealing in a direction perpendicular thereto.

It is another aim of the present invention to provide a new and improved O-ring seal useful for maintaining effective sealing between relatively axially displaceable parts.

Other objects will be in part obvious and in part pointed out more in detail hereinafter.

A better understanding of the invention will be obtained from the following detailed description and the accompanying drawings of illustrative applications of the invention.

BRIEF DESCRIPTION OF THE DRAWINGS

I the drawings:

FIG. 1 is a longitudinal section view, partly broken away and partly in section, of a valve incorporating an embodiment of a seal of the present invention;

FIG. 2 is an enlarged section view, partly in section, of a seal of the type shown in FIG. 2;

FIG. 3 is an enlarged side view, partly broken away, of the seal;

FIG. 4 is an enlarged perspective view, partly broken away and partly in section, of another embodiment of a seal of the present invention;

DESCRIPTION OF THE PREFERRED EMBODIMENTS

Figure 5:
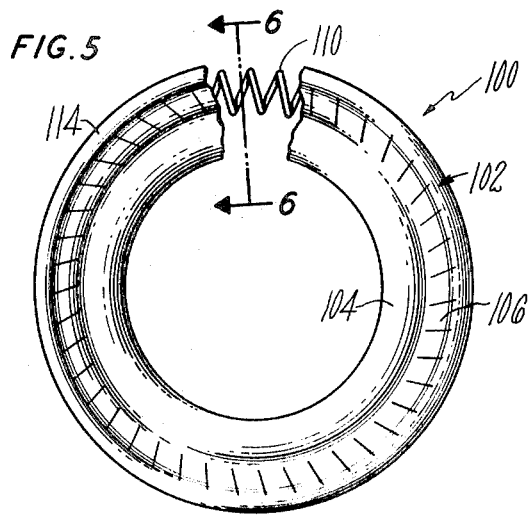
FIG. 5 is an enlarged side view, partly broken away, of a further embodiment of a seal of the present invention.

Referring now to the drawings in greater detail wherein like reference numerals represent like parts throughout the several figures, and referring particularly to FIGS. 1–3, an embodiment 52 of a seal of the present invention is shown in FIG. 1 installed in a spool valve 50. The spool valve 50 is shown comprising an elongated housing 10 with five ports 12, 14, 16 adapted to be selectively interconnected in accordance with the position of a spool or valve member 22 reciprocable within the housing 10. Spacer bushings 20 are slidably mounted within a bore 18 of the housing 10 for receiving the spool 22, and the seals 52 are positioned intermediate the spacers 20 and between the spacers and end walls of the bore 18. Any suitable means can be used to position the spool 22, such as a spring and piston shown at opposite ends of the spool.

The seals 52 provide for sealing the spool 22 to prevent axial flow of fluid along the spool. Thus, in the embodiment of FIGS. 1–3 the seals 52 provide for sealing contact in a radial direction. Also it can be seen upon reference to FIG. 1 that the seals 52 tend to be compressed in the axial direction by a force equal to the product of the fluid pressure acting on the seal and the projected area of the seal. It has been found in the past that such a force perpendicular to the direction of sealing will often compress and thereby deform the seal sufficiently to cause the inner sealing edge of the seal to become wedged between the spool 22 and the spacer bushings 20.

In accordance with the present invention the seal 52 is reinforced to provide for strengthening the seal against excessive distortion in the axial direction due to forces on the seal such as those occurring in the valve shown in FIG. 1, and the seal is contoured to provide effective sealing notwithstanding the greater seal rigidity provided by the reinforcing member.

Referring to FIGS. 2 and 3 the seal 52 comprises an annular molded body 28 of suitable elastomeric material such as synthetic rubber. An annular endless coil spring 34 having substantially circular coils or convolutions is mounted within the seal body 28 coaxially therewith, and as shown in FIG. 2, has an axial thickness substantially equal to but slightly less than the maximum axial thickness of the annular body 28 such that the individual convolutions of the spring provide for preventing excessive deformation of the seal body in the axial direction. The molded seal body 28 is contoured to have an elongated or oval shape in transverse section as seen in FIG. 2 and to provide radially opposed inner and outer sealing ribs with radially opposed inner and outer sealing edges 30, 32 respectively spaced from the coil spring to provide adequate seal resiliency in the radial direction. In the embodiment shown in FIGS. 2 and 3 the diameter of the annular spring 34 is such that the spring is positioned within the seal body 28 to provide a larger inner sealing rib than outer sealing rib. Such a construction has particular usefulness, as in the valve of FIG. 1, wherein the part surrounded by the seal is adapted to reciprocate relative to the seal.

Referring to FIG. 4 another embodiment 520 of a reinforced seal of the present invention comprises an annular elastomeric seal body 280 having a circular shape in transverse section and an annular spring 340 having flat axially extending wave-type spring elements. The spring 340 is mounted coaxially within the seal body 280 and is shown having a diameter for dividing the seal body 280 into inner and outer sealing ribs having substantially the same size in transverse cross section. The spring 340 provides for rigidifying the seal body to prevent excessive axial deformation of the seal body, and the opposed flat edges or crests of the spring 340 are preferably spaced to provide an axial thickness substantially equal to but slightly less than the axial thickness of the seal body 280.

Figure 6:
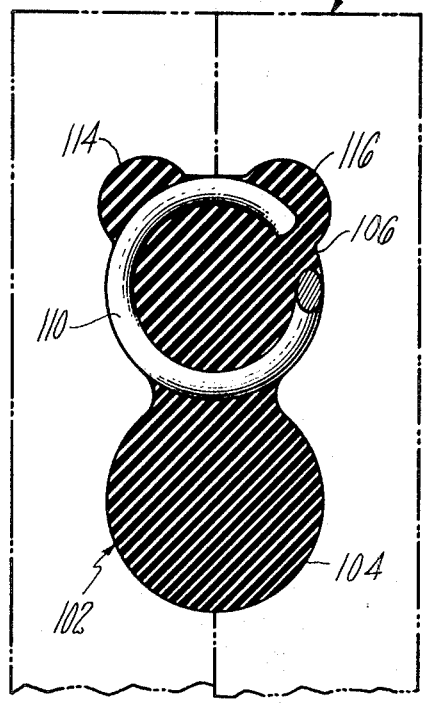
FIG. 6 is an enlarged transverse section view, partly broken away and partly in section, taken along line 6—6 of FIG. 5, and additionally showing in part in broken lines a mold for the seal.

Referring to FIGS. 5 and 6, a further embodiment 100 of a reinforced seal of the present invention is shown comprising a seal body 102 having in transverse section an elongated generally hourglass shape with inner and outer body portions 104, 106 respectively. An annular coil spring 110 like that shown in the embodiments of FIGS. 1–3 is mounted within the outer body portion 106, and the individual coils or convolutions of the coil spring 110 have a diameter substantially equal to the diameter of the generally circular shape, in transverse section, of the outer body portion 106. Accordingly, the outer body portion 106 of the seal is relatively rigid excepting for a pair of outer annular ribs 114, 116 thereof. These ribs 114, 116 in the unstressed state of the seal as shown in FIG. 5 extend beyond the reinforcing spring 110, substantially outwardly in the radial direction and slightly outwardly in both axial directions, to provide for significant radial and some axial compression of the outer body portion 106. The annular ribs 114, 116 thereby provide the principal sealing surfaces of the outer body portion 106 of the seal.

The inner body portion 104 of the seal provides an inner sealing rib opposite the outer sealing ribs 114, 116. The inner annular body portion or rib 104 is, however, protected by the coil spring 110 embedded in the upper body portion 106 against substantial axial compression. Thus, the inner annular body portion 104 is effectively reinforced against excessive axial compression without reducing its sealing effectiveness.

Figure 7:
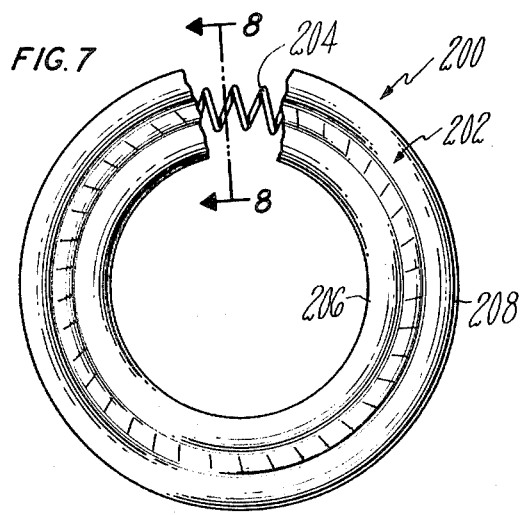
FIG. 7 is an enlarged side view, partly broken away, of a still further embodiment of a seal of the present invention.
Figure 8:
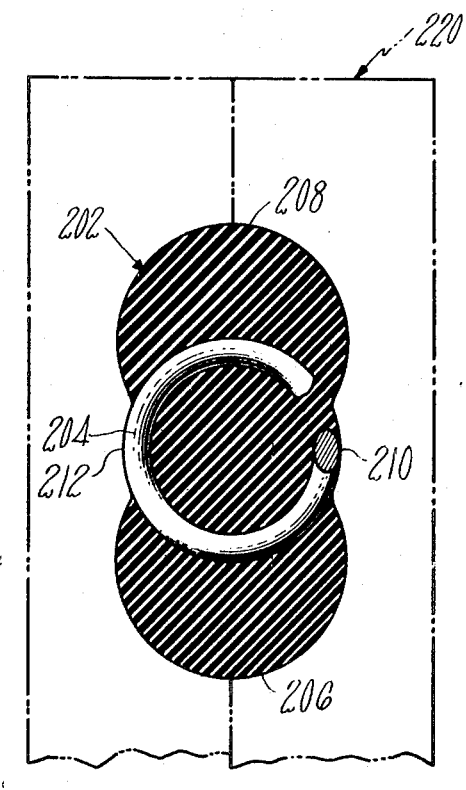
FIG. 8 is an enlarged transverse section view, partly broken away and partly in section, taken along line 8—8 of FIG. 7, and additionally showing in part in broken lines a mold for the seal.

Referring to FIGS. 7 and 8 a still further embodiment 200 of the seal of the present invention is shown comprising a seal body 202 with an elongated generally hourglass shape having inner and outer radially opposed sealing ribs 206, 208 and a reinforcing coil spring 204 embedded within the annular body 202 intermediate the inner and outer sealing ribs 206, 208. The diameter of the individual coils of the coil spring 204 is substantially equal to the diameter of the central portion in transverse section of the seal body. The radially opposed sealing ribs 206, 208 extend in both axial directions beyond the central edges 210, 212 of the coil spring 204 such that both ribs 206, 208 provide some axial resiliency of the seal body. In addition, each of the ribs 206, 208 provide effective sealing in the radial direction.

The embodiment 100 of FIGS. 5 and 6 and the embodiment 200 of FIGS. 7 and 8 provide for accurately locating the reinforcing springs within the seal body when the seal is formed. For purposes of illustration, seal molds 120 (FIG. 6) and 22 (FIG. 8) are shown in part in broken lines, and it can be seen that the coil springs are adapted to be inserted between the two mold halves and rigidly retained thereby while the seal body is molded integrally with the coil spring. more specifically the individual coils of the coil springs are clamped by the mold halves along two substantially diametrically spaced portions of the spring coils to accurately retain the springs within the molds.

The present invention thus provides a novel composite O-ring-type seal utilizing a reinforcing member which prevents excessive distortion of the seal and an elastomeric seal body which is contoured to provide effective sealing. Also, the novel seal is notably useful for example in valves for sealing relatively axially displaceable parts.

As will be apparent to persons skilled in the art, various modifications, adaptions and variations of the foregoing specific disclosure can be made without departing from the teachings of the present invention.

I claim:

1. A composite annular seal useful in providing radial sealing comprising an annular body of elastomeric material and an annular reinforcing spring at least substantially embedded within said annular body generally coaxially therewith, the reinforcing spring being resilient circumferentially for permitting circumferential expansion of the annular seal from a normal state thereof and being rigid in an axial direction for preventing excessive seal distortion and resulting improper radial sealing from axial compression forces on the seal; the composite elastomeric body and reinforcing spring having a substantially symmetrical and uniform transverse cross section with an elastomeric body section with a radial thickness greater than the radial thickness of the reinforcing spring by a first relatively large amount and an axial width greater than the axial width of the reinforcing spring by a second relatively small amount, the annular elastomeric body having annular sealing ribs radially inwardly and radially outwardly of the annular reinforcing spring to provide for inner and outer radial sealing whereby the seal may be expanded to provide appropriate inner radial sealing pressure and the reinforcing spring prevents seal distortion and resulting improper radial sealing from axial compression forces on the deal.

2. A composite annular seal according to claim 1 wherein the annular spring is an axially extending wave spring.

3. A composite annular seal according to claim 1 wherein the annular body, in transverse section, is generally elongated in the radial direction.

4. A composite annular seal according to claim 3 wherein the annular spring is a coil spring.

5. A composite annular seal according to claim 4 wherein the annular body is integrally formed with the coil spring, wherein the coil spring has individual coils of substantially constant diameter, and wherein the annular body has at least an annular section thereof substantially coextensive with the individual spring coils to provide for locating the annular spring within the annular body when it is molded.

6. A composite annular seal according to claim 5 wherein the annular body has in transverse section a generally hourglass shape.

7. A composite annular seal according to claim 6 wherein the annular body is contoured to provide a single outer annular rib and a single inner annular rib of substantially the same size in transverse section.

8. A composite, annular seal according to claim 4 wherein the annular body is contoured to provide a pair of axially spaced annular sealing ribs on one radial side of the coil spring.